United States Patent
Behrens et al.

(10) Patent No.: US 7,152,065 B2
(45) Date of Patent: Dec. 19, 2006

(54) INFORMATION RETRIEVAL AND TEXT MINING USING DISTRIBUTED LATENT SEMANTIC INDEXING

(75) Inventors: Clifford A. Behrens, Madison, NJ (US); Devasis Bassu, Flanders, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 0 days.

(21) Appl. No.: 10/427,595

(22) Filed: May 1, 2003

(65) Prior Publication Data

US 2004/0220944 A1 Nov. 4, 2004

(51) Int. Cl.
G06F 17/30 (2006.01)
(52) U.S. Cl. .......................................... 707/5; 707/102
(58) Field of Classification Search ................ 707/100, 707/102, 104.1, 5; 715/500
See application file for complete search history.

(56) References Cited

U.S. PATENT DOCUMENTS

| | | | | |
|---|---|---|---|---|
| 4,839,853 A | 6/1989 | Deerwester et al. | ........ | 364/900 |
| 5,301,109 A | 4/1994 | Landauer et al. | ...... | 364/419.19 |
| 2002/0026456 A1* | 2/2002 | Bradford | | |
| 2003/0037073 A1* | 2/2003 | Tokuda et al. | | |

OTHER PUBLICATIONS

Berry, M., et al., "Using Linear Algebra for Intelligent Information Retrieval," SIAM Review 37(4): pp. 573-595, Dec. 1994.
Steinbach, M., et al., "A Comparison of Document Clustering Techniques," Technical Report 00-034, Department of Computer Science and Engineering, University of Minnesota, 2000.

* cited by examiner

*Primary Examiner*—Greta Robinson
(74) *Attorney, Agent, or Firm*—Joseph Giordano; William A. Schoneman (57) ABSTRACT

The use of latent semantic indexing (LSI) for information retrieval and text mining operations is adapted to work on large heterogeneous data sets by first partitioning the data set into a number of smaller partitions having similar concept domains. A similarity graph network is generated in order to expose links between concept domains which are then exploited in determing which domains to query as well as in expanding the query vector. LSI is performed on those partitioned data sets most likely to contain information related to the user query or text mining operation. In this manner LSI can be applied to datasets that heretofore presented scalability problems. Additionally, the computation of the singular value decomposition of the term-by-document matrix can be accomplished at various distributed computers increasing the robustness of the retrieval and text mining system while decreasing search times.

28 Claims, 5 Drawing Sheets

INFORMATION RETRIEVAL AND TEXT MINING USING DISTRIBUTED LATENT SEMANTIC INDEXING

FIELD OF THE INVENTION

This invention is related to a method and system for the concept based retrieval and mining of information using a distributed architecture. More specifically, the present invention partitions a heterogeneous collection of data objects with respect to the conceptual domains found therein and indexes the content of each partitioned sub-collection with Latent Semantic Indexing (LSI), thereby enabling one to query over these distributed LSI vector spaces. Vector space representations of these sub-collections of data objects can be used to select appropriate sources of information needed to respond to a user query or mining operation.

BACKGROUND

Latent Semantic Indexing (LSI) is an advanced information retrieval (IR) technology that is a variant of the vector retrieval method that exploits dependencies or "semantic similarity" between terms. It is assumed that there exists some underlying or "latent" structure in the pattern of word usage across data objects, such as documents, and that this structure can be discovered statistically. One significant benefit of this approach is that, once a suitable reduced vector space is computed for a collection of documents, a query can retrieve documents similar in meaning or concepts even though the query and document have no matching terms.

An LSI approach to information retrieval is detailed in commonly assigned U.S. Pat. No. 4,839,853 applies a singular-value decomposition (SVD) to a term-document matrix for a collection, where each entry gives the number of times a term appears in a document. A large term-document matrix is typically decomposed to a set of approximately 150 to 300 orthogonal factors from which the original matrix can be approximated by linear combination. In the LSI-generated vector space, terms and documents are represented by continuous values on each of these orthogonal dimensions; hence, are given numerical representation in the same space. Mathematically, assuming a collection of m documents with n unique terms that, together, form an n×m sparse matrix E with terms as its rows and the documents as its columns, each entry in E gives the number of times a term appears in a document. In the usual case, log-entropy weighting (log(tf+1)entropy) is applied to these raw frequency counts before applying SVD. The structure attributed to document-document and term-term dependencies is expressed mathematically in equation (1) as the SVD of E:

$$E = U(E)\Sigma(E)V(E)^T \qquad (1)$$

where $U(E)$ is an n×n matrix such that $U(E)^T U(E) = I_n$, $\Sigma(E)$ is an n×n diagonal matrix of singular values and $V(E)$ is an n×m matrix such that $V(E)^T V(E) = I_m$, assuming for simplicity that E has fewer terms than documents.

Of course the attraction of SVD is that it can be used to decompose E to a lower dimensional vector space k as set forth in the rank-k reconstruction of equation (2).

$$E_k = U_k(E)\Sigma_k(E)V_k(E)^T \qquad (2)$$

Because the number of factors can be much smaller than the number of unique terms used to construct this space, words will not be independent. Words similar in meaning and documents with similar content, based on the words they contain, will be located near one another in the LSI space. These dependencies enable one to query documents with terms, but also terms with documents, terms with terms, and documents with other documents. In fact, the LSI approach merely treats a query as a "pseudo-document," or a weighted vector sum based on the words it contains. In the LSI space, the cosine or dot product between term or document vectors corresponds to their estimated similarity, and this measure of similarity can be exploited in interesting ways to query and filter documents. This measure of correspondence between query vector q and document vector d is given by equation (3).

$$\text{sim}(U_k(E)^T q, U_k(E)^T d) \qquad (3)$$

In "Using Linear Algebra for Intelligent Information Retrieval" by M. Berry et al., *SIAM Review* 37(4): pp. 573–595 the authors provide a formal justification for using the matrix of left singular vectors $U_k(E)$ as a vector lexicon.

Widespread use of LSI has resulted in the identification of certain problems exhibited by LSI when attempting to query massive heterogeneous document collections. An SVD is difficult to compute for extremely large term-by-document matrices, and the precision-recall performance tends to degrade as collections become very large. Surprisingly, much of the technical discussion surrounding LSI has focused on linear algebraic methods and algorithms that implement these, particularly problems of applying SVD to massive, sparse term-document matrices. Evaluations of the effect of changing parameters, e.g., different term weightings and the number of factors extracted by SVD, to the performance of LSI have been performed. Most of the approaches to make LSI scale better have been sought from increasing the complexity of LSI's indexing and search algorithms.

LSI is limited as an information retrieval and text mining strategy when document collections grow because with large collections there exists an increasing probability of drawing documents from different conceptual domains. This has the effect of increasing the semantic heterogeneity modeled in a single LSI vector space, thus of introducing noise and "confusing" the LSI search algorithm. As polysemy becomes more pronounced in a collection, vectors for terms tend to be represented by the centroid of all vectors for each unique meaning of the term, and since documents vectors are computed from the weighted sum of vectors for the terms they contain, the semantics of these are also confounded.

In general, the number of conceptual domains grows with the size of a document collection. This may result from new concepts being introduced into the information space, or an existing concept becoming extremely large (in number of documents) with further differentiation of its sub-concepts. In both cases, the compression factor in any vector space-based method has to be increased to accommodate this inflation.

The deleterious effects of training on a large conceptually undifferentiated document collection are numerous. For example, assume that documents drawn from two conceptual domains, technology and food, are combined without sourcing into a single training set and that LSI is applied to this set to create a single vector space. It is easy to imagine how the semantics of these two domains might become confused. Take for instance the location of vectors representing the terms "chip" and "wafer." In the technology domain, the following associations may be found: silicon chip, silicon wafer, silicon valley, and copper wafer. However, in the food domain the terms chip and wafer take-on different meanings and there may be very different semantic relationships: potato chip, corn chip, corn sugar, sugar wafer. But these semantic distinctions become confounded in the LSI vector space. By training on this conceptually undifferentiated corpus, vectors are computed for the shared terms "chip" and "wafer" that really don't discriminate well the distinct meanings that these terms have in the two conceptual domains. Instead, two semantically "diluted" vectors that only represent the numerical average or "centroid" of each term's separate meaning in the two domains is indexed.

Therefore, it would be desirable to have a method and system for performing LSI-based information retrieval and text mining operations that can be efficiently scaled to operate on large heterogeneous sets of data.

Furthermore, it would be desirable to have a method and system for performing LSI-based information retrieval and text mining operations on large data sets quickly and accurately.

Additionally, it would be desirable to have a method and system for performing LSI-based information retrieval and text-mining operations on large data sets without the deleterious effects of mixing conceptually differentiated data.

Also, it would be desirable to have a method and system for the processing of large document collections into a structure that enables development of similarity graph networks of sub-collections having related concept domains.

Additionally, it would be desirable to have a method and system that enables a user to query the document collection in a flexible manner so that the user can specify the degree of similarity necessary in search results.

SUMMARY

The present invention provides a method and system for taking a massive, heterogeneous set or collection of data objects (also referred to as a set of documents) and partitioning it into more semantically homogeneous concept spaces or sub-collections. This enables LSI to perform better in the respective vector spaces computed for each of these. Mathematically, this approach amounts to an approximate block-diagonalization of the term-document matrix and obtaining SVD's for each of these blocks. The query process is then a mapping onto the network of overlapping blocks, using similarity metrics to indicate how much these blocks actually overlap.

Preprocessing the heterogeneous document collection before computing a term-by-document matrix into sub collection of documents sorted by conceptual domain permits each domain (sub-collection) to be processed independently with LSI. This reduces both storage and computational overhead and opens the possibility of distributing vector spaces (and searches of them) over a wider network of resources. An added benefit of this approach would be greater semantic resolution for any one vector space gained from fewer dimensions, i.e., LSI models exhibiting greater parsimony.

A large data collection or plurality of data collections are screened for the existence of grouping or clustering effects. If a data collection is known to be homogenous then the initial screening/clustering step may be skipped for that collection. This information is then used to segregate documents into more semantically homogeneous sub collections before applying SVD to each. To determine whether a user's query was appropriate for a particular LSI vector space, i.e., whether the intended semantics of a query matched those of a particular document collection, the paired similarity between the semantic structures of all LSI vector spaces is computed. This distance measure is based on the similarity of semantic graphs formed from words shared by each pair of vector spaces. The semantics for a query might be inferred from multiple query terms and by presenting a user with the different semantic contexts for query terms represented in all LSI vector spaces, then exploit this information to properly source queries and fuse hit lists. The main idea is to partition a large collection of documents into smaller sub-collections that are conceptually independent (or nearly independent) of each other, and then build LSI vector spaces for each of the sub-collections "Conceptual independence" may mean the presence of some terms common to two LSI spaces whose semantic similarity measure (defined later on) is approximately zero. In this case, the common terms represent polysemy (multiple meanings for a term) over the conceptual domains involved. A multi-resolution conceptual classification is performed on each of the resulting LSI vector spaces. In a realistic situation, there may be quite a few common terms present between any two conceptual domains. To address the possible problem of synonymy and polysemy in the query, a network/graph of the conceptual domains based on links via common terms is generated. Then this graph is examined at query time for terms that are nearest neighbors to ensure that each contextually appropriate LSI space is properly addressed for a user's query terms. The use of LSI in developing a query vector enables the user to select a level of similarity to the initial query. If a user prefers to receive additional documents that may be more peripherally related to the initial query, the system will expand the query vector using LSI techniques.

DETAILED DESCRIPTION

Figure 1:
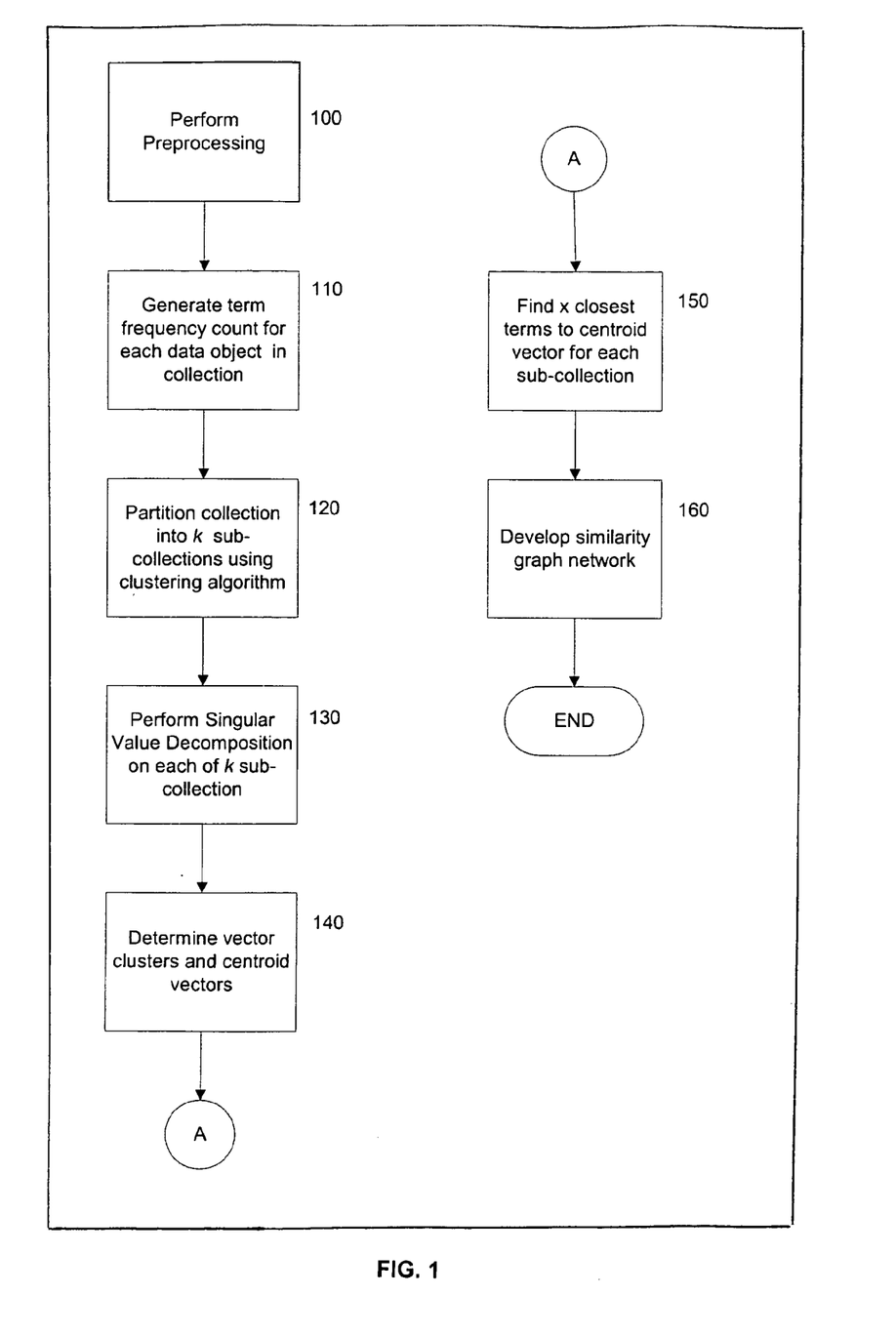
FIG. 1 depicts a flow diagram of the method of processing document collections in accordance with the present invention.

Referring to FIG. 1 the inventive method of the document collection processing of the present invention is set forth. At step 110 the method of the present invention generates a frequency count for each term in each document in the collection (or set) of documents. The term "data objects" in this context refers to information such as documents, files, records etc. Data objects may also be referred to herein as documents.

In an optional preprocessing step 100 the terms in each document are reduced to their canonical forms and a predetermined set of "stop" words are ignored. Stop words are typically those words that are used as concept connectors but provide no actual content such as "a" "are" "do" "for" etc. The list of common stop words is well known in the art. Suffix strippers that reduce a set of similar words to their canonical forms are also well known in the art. Such a stripper or parser will reduce a set of words such as computed, computing and computer to a stem word "compute" thereby combining the frequency counts for such words and reducing the overall size of the set of terms.

At step 120 the heterogeneous collection of data objects is partitioned by concept domain into sub-collections of like concept. If it is known that one or more separate sub-collections within a larger collection of data are homogenous in nature, the initial partitioning need not be done for those known homogenous data collections. For initial sorting of data objects into more conceptually homogeneous sub collections, the bisecting k-means algorithm in a recursive form with k=2 at each stage to obtain k clusters is preferably used. Clustering techniques have been explored in "A Comparison of Document Clustering Techniques" by M. Steinbach et al. *Technical Report* 00-034, Department of Computer Science and Engineering, University of Minnesota. Although the bisecting k-means algorithm is preferred, the "standard" k-means algorithm or other types of spatial clustering algorithms may be utilized. Other types of clustering algorithms including hierarchical clustering algorithms may be used.

Preferentially, the plurality of data object clusters can be further refined by performing a series of iterations of the bisecting k-means algorithm. At step 130, the Singular Value Decomposition (described below) is then applied to reduce each of these k clusters or sub-collections of documents to generate a reduced vector space having approximately 200 orthogonal dimensions. At 200 dimensions, the size is manageable yet able to capture the semantic resolution of the sub-collection. Different sizes may be used depending on constraints such as available computing power and time.

At step 140, using the k-means or other appropriate algorithm, clustering is then performed on each of these reduced vector spaces to discover vector clusters (representing core concepts) and their centroid vectors for each sub-collection. Alternatively, instead of applying the clustering algorithm to the reduced vector space, the vector clusters and centroid vectors could be obtained from the clustering data obtained at step 120. Once these centroid vectors are obtained, a predetermined number of closest terms to each of these centroid vectors are found at step 150. In a preferred embodiment of the present invention the number of key words is set to 10 per cluster although different numbers of key words may be appropriate in different situations. These are used as keywords to label this sub-collection thereby identifying the concept cluster therein. Each of the k vector spaces provides a different resolution to the underlying concepts present in the data and the context of each one is represented by its own set of keywords.

Having computed the LSI vector space for each contextually related sub collection of documents and having extracted the keywords that represent the core concepts in each, the next step 160 is to establish the contextual similarity between these spaces. Step 160 is necessary to select and search contextually appropriate LSI vector spaces in response to a query. Two graph-link measures are developed to establish a similarity graph network. A user query is passed on to the similarity graph network where proper queries are generated for each LSI vector space, and then each works independently to retrieve useful documents.

This important step 160 is described in detail below. Sub collections $C_1, C_2, \ldots, C_k$ denote the k concept domains obtained as a partition of the document class C using the k-means clustering algorithm. Terms $T_1, T_2, \ldots, T_k$ denote the corresponding term sets for the k concept domains. With $t_i$ denoting the cardinality of $T_i$ for i=1, 2, . . . , k and $V_1$, $V_2, \ldots, V_k$ corresponding to the eigen matrices for the k term spaces in the SVD representation, then there are f factors in each of these LSI spaces and equation (4) forms the rank reduced term eigen basis for the i-th concept domain.

$$V_i = [v_1^i v_2^i \ldots v_f^i] \qquad (4)$$

Doument sets, $D_1, D_2, \ldots, D_k$, are the corresponding document sets for the k concept domains. Let $d_i$ denote the cardinality of $D_i$ for i=1, 2, . . . , k. Further, let $U_1$, $U_2, \ldots, U_k$ be the corresponding eigen matrices for the k document spaces in the SVD representation. Here, $U_i = [u_1^i u_2^i \ldots u_f^i]$ forms the rank reduced document eigen basis for the i-th concept domain. $T_{ij} = T_i \cap T_j$ is the set of common terms for the concept domains $C_i$ and $C_j$. In addition, $t_{ij}$ is the cardinality of $T_{ij}$, $m_i = V_i V_i'$ is the term similarity matrix for the concept domain $C_i$, $m_i^Q$ is the restriction of $m_i$ to the term set Q—obtained by selecting only those rows/columns of $m_i$ corresponding to the terms appearing in Q (for example, $m_i^Q = m_i$ for $Q = T_i$). The projection of the term vector v into the term space generated by the SVD is given by $V_i v$ for the i-th concept domain.

Figure 2A:
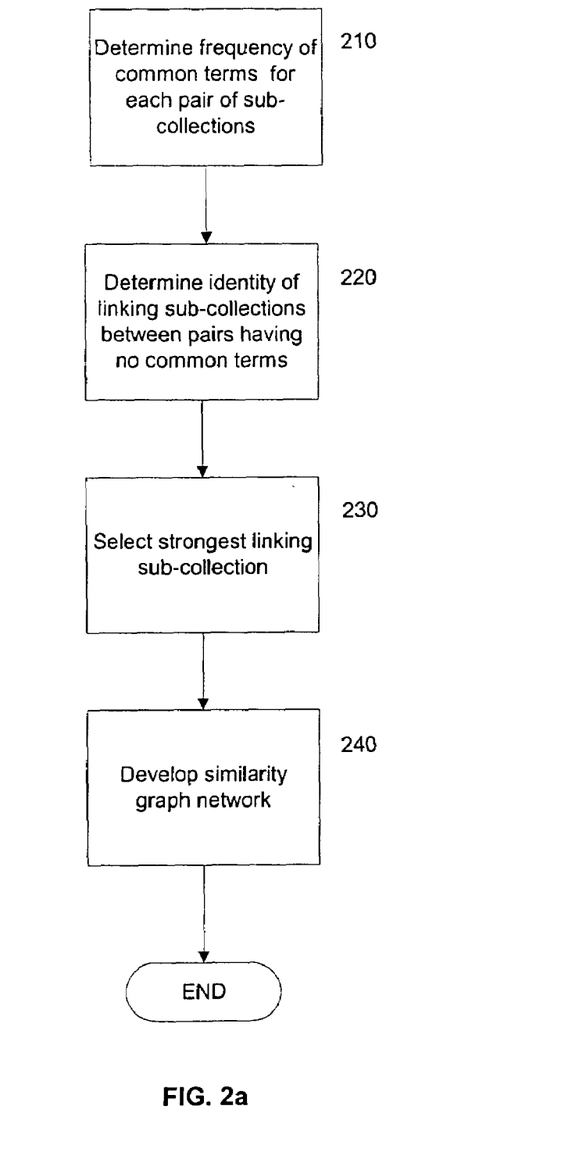
FIGS. 2a and 2b depict flow diagrams of the method of processing document collections in accordance with the present invention, particularly the generation of data on the similarity of sub-collections.
Figure 2B:
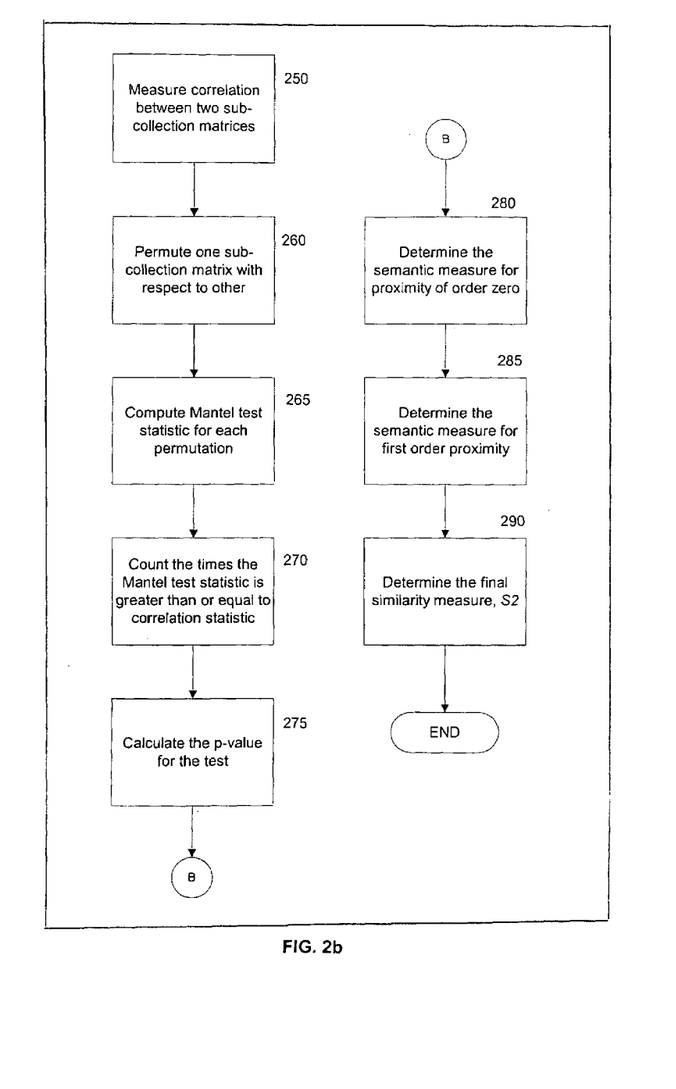

The method of the present invention exploits two different ways in which the similarity between two concept domains can be measured as set forth in FIGS. 2a and 2b. The first similarity measure is the number of terms common to each concept domain. With common terms, it is necessary to exclude high frequency terms that act as constructs for the grammar rather than conveying any actual meaning. This is largely achieved during document preprocessing in step 100 by filtering them with a stop-word list, but if such preprocessing was not performed the operation could be performed now in order to exclude unnecessary high frequency terms.

The first measure captures the frequency of occurrence of common terms between any two concept domains. The underlying idea is that if many terms are common to their vector spaces, then they ought to be describing the same thing, i.e., they have similar semantic content and provide similar context. This process is described with reference to FIG. 2a. Considering the concept domains $C_i$ and $C_j$, in the case where the common set $T_{ij}$ is non-empty, the proximity between these two spaces is defined to be of order zero and the frequency measure to be given by equation (5).

$$s_{ij}^0 = \frac{t_{ij}^2}{t_i t_j} \qquad (5)$$

At step 210 of FIG. 2a this frequency measure is determined for each pair of sub-collections. When $T_{ij}$ is empty, there are no common terms between sub-collections $C_i$ and $C_j$. There may be, however, some other space $C_1$ which has common terms with both $C_i$ and $C_j$, i.e., $T_{i1}$ and $T_{j1}$ are both non-empty. Then, the concept spaces $C_i$ and $C_j$ could be linked via an intermediate space $C_1$. At step 220 of FIG. 2b this is determined. In the case where there are several choices for this intermediate space, the "strongest link" is selected at step 230 using equations (6) and (7). Here, the proximity between $C_i$ and $C_j$ is stated as being of order one and the frequency measure is given by equation (6) with the similarity measure s1 given by equation (7) where p is the proximity between two spaces.

$$s_{i,j}^1 = \max_p \frac{t_{ip}^2 t_{pj}^2}{t_i t_p^2 t_j} \tag{6}$$

$$s1 = (s_{ij}^p + p)^{-1} \tag{7}$$

The similarity measure above takes into account the proximity between the two concept spaces along with the occurrence of common terms. Using the data from steps 210 and 230 a similarity graph network can be mapped showing a relationship between sub-collections, either directly or through a linking sub-collection at step 240.

The second measure of similarity is more sensitive to the semantics of the common terms, not just how many are shared by two concept domains. The semantic relationships between the common terms (no matter how many there are) in each of the concept domains are examined to determine whether they are related in the same way.

At step 250 of FIG. 2b, the correlation between two matrices X and Y (both of dimensions m×n) is measured, preferably by use of equations (8), (9) (10) and (11).

$$r(X,Y) = \left| \frac{1}{m \cdot n} \sum_{i=1}^{m} \sum_{j=1}^{n} \left( \frac{X_{ij} - \overline{X}}{S_X} \right) \left( \frac{Y_{ij} - \overline{Y}}{S_Y} \right) \right| \tag{8}$$

where $$\overline{X} = \frac{1}{m \cdot n} \sum_{i=1}^{m} \sum_{j=1}^{n} X_{ij}, \quad \overline{Y} = \frac{1}{m \cdot n} \sum_{i=1}^{m} \sum_{j=1}^{n} Y_{ij}, \tag{9}$$

$$S_X = \frac{1}{m \cdot n} \sum_{i=1}^{m} \sum_{j=1}^{n} X_{ij}^2 \tag{10}$$

$$S_Y = \frac{1}{m \cdot n} \sum_{i=1}^{m} \sum_{j=1}^{n} Y_{ij}^2 \tag{11}$$

At step 260 one of the matrices (say X) is held fixed while the other one (Y) is permuted (rows/columns). For each such permutation, the Mantel test statistic is computed at step 265. At step 270 the number of times where the obtained statistic is greater than or equal to (NGE) the test statistic value obtained with the original X and Y is counted. The total number of such permutations is denoted by $N_{runs}$. Usually, around 1000 permutations are sufficient for 5% level of significance and 5000 permutations for 1% level of significance. The p-value for the test is then determined at step 275 by equation (12) and the results of the Mantel test are considered acceptable is the p-value is within a predetermined range considering the number of permutations used to achieve the level of significance. For 1000 permutations, the p-value should be less than approximately 0.05 to consider the test result acceptable.

$$p\text{-value} = \frac{NGE + 1}{N_{runs} + 1} \tag{12}$$

Corresponding to the first similarity measure, the semantic measure for a proximity of order zero is determined at step 280 by equation (13).

$$s_{ij}^0 = r\left(m_i^{T_{ij}}, m_j^{T_{ij}}\right) \tag{13}$$

Similarly, the measure for the first order proximity is determined at step 285 by equation (14).

$$s_{ij}^1 = \max_p r\left(m_i^{T_{ip}}, m_p^{T_{ip}}\right) r\left(m_p^{T_{pj}}, m_j^{T_{pj}}\right) \tag{14}$$

Then at step 290 the final semantic similarity measure s2 is given by equation (15) where p again is the proximity between the two spaces.

$$s2 = (s_{ij}^p + p)^{-1} \tag{15}$$

A preferred embodiment of the present invention uses the second similarity measure when comparing the semantics of LSI vector spaces. But it should be noted that its validity is given by the first similarity measure (the proportion of common terms). Suppose the second measure has a very high value (strong semantic relationship) but it turns out that there were only two common terms out of a total of 100 terms in each concept domain. Then the measure is subject to high error. In this situation, the first measure clearly exposes this fact and provides a metric for validating the semantic measure. Both measures are needed to obtain a clear indication of the semantic similarity (or lack thereof) between two concept domains. The most preferred measure of similarity, therefore, is the product of these two.

Having measured the contextual similarity between vector spaces, the method resulting similarity graph network and "identifying concept" terms are used in information retrieval or data mining operation. In order to perform an information retrieval, the similarity between the query and a concept domain's vector space so that useful documents in it may be retrieved.

Figure 3:
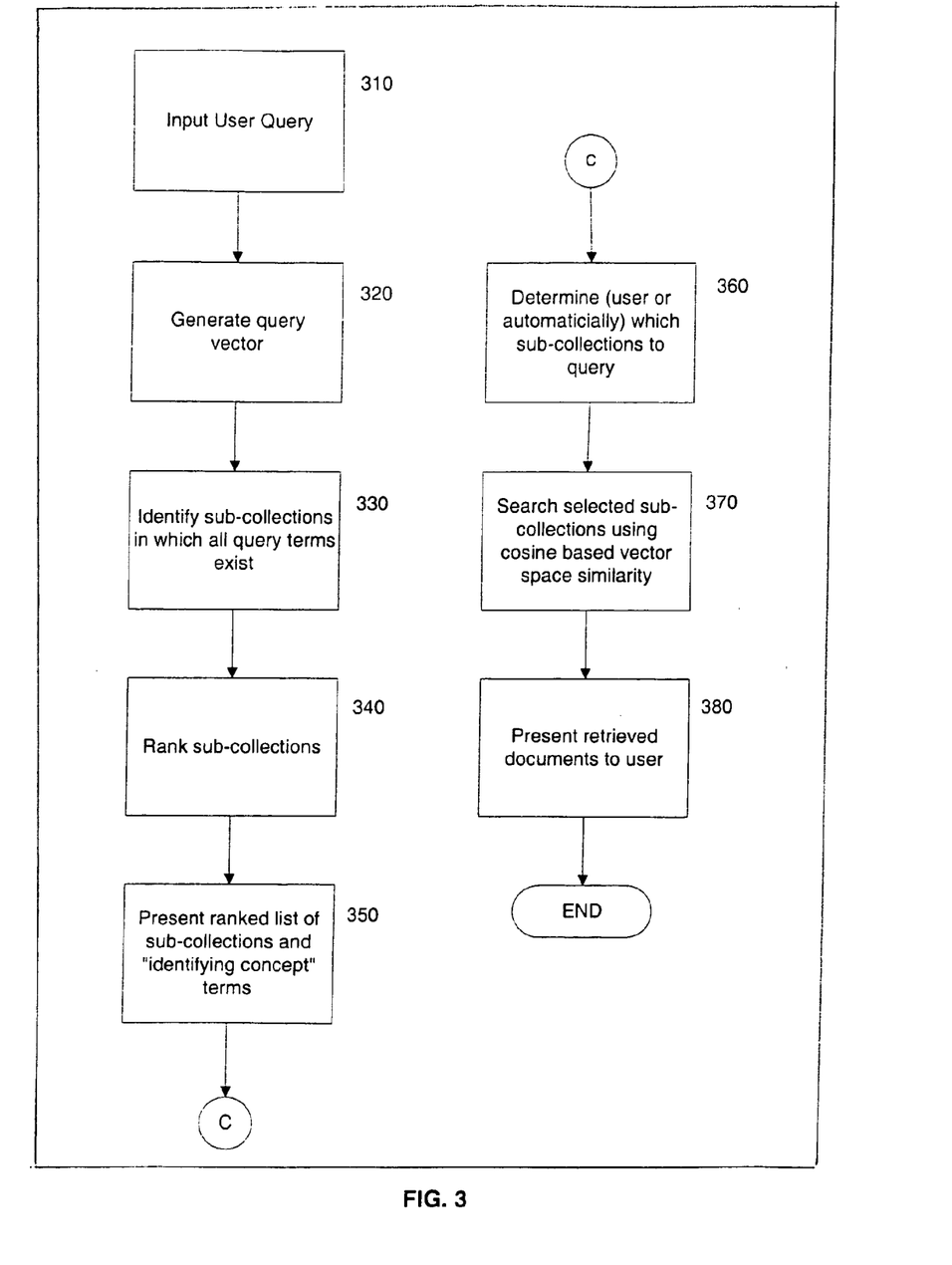
FIG. 3 depicts a flow diagram of the method of querying the collection of documents processed in accordance with the methods of the present invention; and, FIG. 4 depicts a schematic diagram of one embodiment of a distributed LSI system in accordance with the present invention.

With reference to FIG. 3, the usual user query Q is a set of terms in $$\bigcup_{i=1}^{k} T_i$$

as input at step 310 by the user. The user may also specify the degree of similarity desired in search results. If a greater degree of searching freedom is desired, the system will expand the query vector as described below. A representative query vector is then generated at step 320 as the normalized sum of each of the projected term vectors in the LSI space. Note that there might be several possible cases, e.g., (1) all the terms in Q are present in the concept domain term set $T_j$, (2) some terms are present, or (3) none are present.

At step 330, the sub-collections in which all the query terms exist in the term set for a concept domain (i.e., sub-collection) are identified. At step 340, if such multiple domains exist then, a ranking of the domains, along with the "meaning" each conveys, is helpful to decide which one to query. If a user has an idea of what he or she is looking for, then the "identifying concept" terms provided (as described above) become useful. On the other hand, for the explorative user without a fixed goal, the ranking supports serendipitous discovery.

The "identifying concept" terms are naturally terms associated with the closest (in cosine measure) projected term vectors to the query vector. Semantically, these terms are also closest to the query terms. As a member of this concept domain, this term set is the best candidate to represent the domain in trying to uncover what the user meant by the query. The ranking is just the value of the cosine measure between the "identifying concept" term vector and the query vector. A list can be presented to the user so that he or she is able to decide which domains should be searched for matching documents. Results are returned to the user in separate lists for each concept domain (sub-collection) at step 350 of FIG. 1. Once the user determines which sub-collections to query based on the lists of ranked sub-collections, at step 360, the information retrieval software uses the standard LSI approach of cosine based vector space similarity to retrieve document matches at step 370 which are then presented to the user at step 380. Alternatively, the selection of the best sub-collections to query can be performed automatically by selecting those with the highest rank first. This would tend to be used more in a strict information retrieval system rather in the more interactive text-mining environment. In a more complicated case some of the query terms are missing from the term set for the concept domain. Again, two approaches are used. In the first approach the process chooses to ignore those missing terms and just proceed as before with terms that are present. In the alternative approach, the process examines relationships between existing terms in the concept domain with the non-existent ones present in the query.

If missing terms are simply ignored, as before, an "identifying concept" term and a rank is presented to the user; but additional care must be taken, for in this case all the query terms do not match. A possible solution is to scale down the rank by the proportion of query terms that were actually used to find the concept term. Then the concept term is obtained exactly as before. The other case in which non-existent query terms are used is actually a particular instance of the next one.

In the worst-case scenario none of the query terms are present in the term set for a concept domain. The question arises whether one would want to query this domain at all. One thing is sure—if there are concept domains that fall into the previous two cases, they should definitely be exploited before any domain falling into this case. One way that this domain can be queried is to examine associations of terms across concept domains to discover synonyms existing in this domain, starting with the query terms. In other words, the entire information space is explored to obtain not just the query terms themselves, but also terms that are strongly related to them semantically. To control the method, a first order association (degree one) is imposed to limit search (where zero order implies the first case described above).

This version of the method depicted in the flow diagram 3 differs from the above discussion only in that the query vector for a concept domain is computed at step 320 as the weighted sum of its projected term vectors in a concept domain similar to some other concept domain that actually contains the query terms. The selection of this other concept domain is based on the domain similarity measure described above (the product measure performs well for this). Once the concept domain is selected that contains the query vectors and also is closest in meaning to the one to be queried, the expanded query vector is constructed for the query domain. With this expanded query vector, it is easy to generate "identifying concept" terms, as before in steps 330 through 370.

Figure 4:
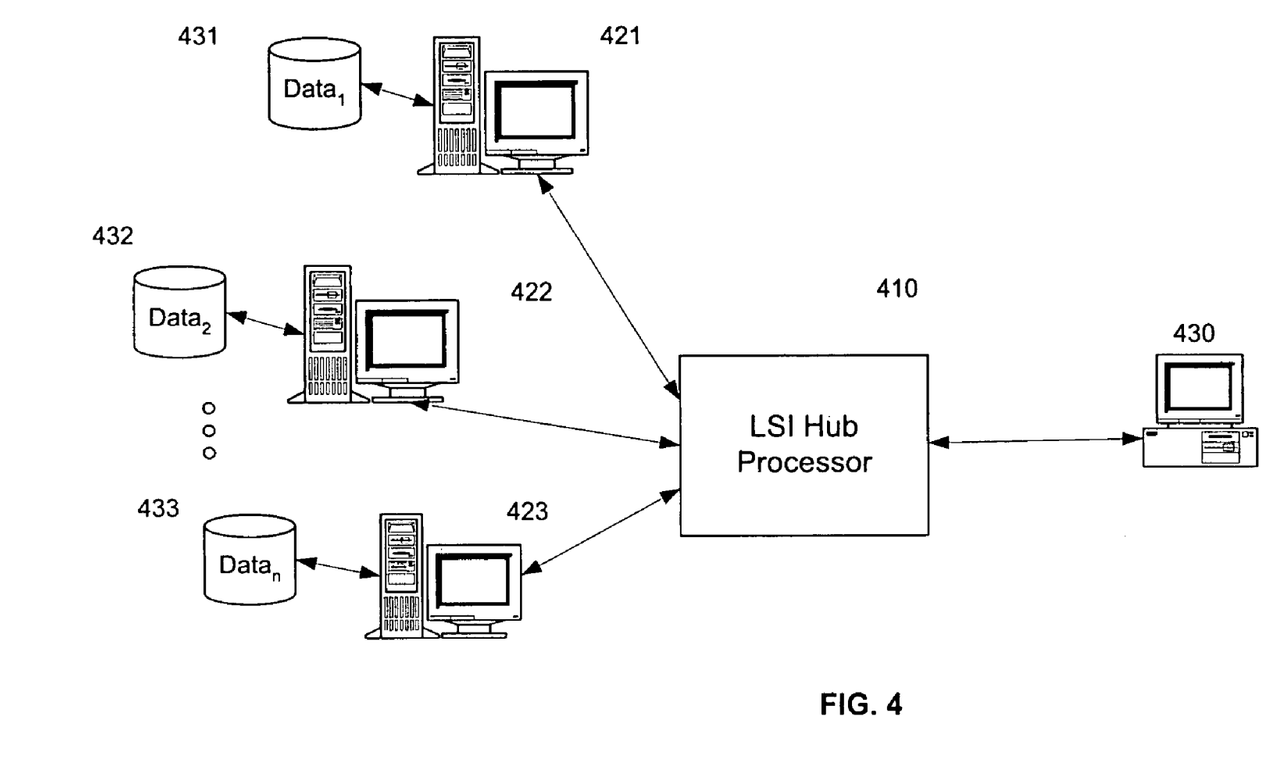

There are two main functions performed in the computation and querying of a distributed LSI space. The first function consists of creating a classification scheme for specifying the multiple LSI vector spaces and consists of steps 110 through 160 and, optionally, step 100 of FIG. 1 and, depending on the similarity technique used, the steps of FIG. 2a or 2b. The second function consists of actually querying this, distributed network of spaces as described by steps 310 through 370 of FIG. 3. From a functional perspective, however, these two functions are independent of each other and the first function can be performed at various locations in a distributed network as depicted in FIG. 4. In FIG. 4 a network configuration for a distributed LSI network is set forth in which an LSI hub processor 410 is used to control the various data object clustering and information query requests. LSI hub processor 410 has three functions: brokering queries, generating similarity graph networks and indexing (ore re-indexing) newly arrived documents. As one or more servers 421–423 are added to the network each having access to a plurality of data objects in an associated database 431–433, the LSI hub processor 410 controls the distributed processing of the data objects in accordance with the method of the present invention in FIG. 1 and FIGS. 2a and/or 2b in order to develop a comprehensive network graph of all data objects across all servers and databases. It should be understood that LSI hub processor 410 may perform some or all of the steps set forth in the partitioning and similarity processing method described above or it may only control the processing in one ore more of the servers 421–423. LSI hub processor 410 can then respond to an information retrieval or data mining query from a user terminal 440. In response to a query from the user terminal 440, the LSI hub processor executes the method of the present invention as described in FIG. 2 and sends query results back to user terminal 440 by extracting those data objects from one or more databases 431–433. From user terminal 440 the user may request LSI hub processor 410 to use the expanded query as discussed above providing extra flexibility to the user.

In this manner LSI hub processor 410 oversees the computationally intensive clustering operations, decomposing operations and generation of the centroid vectors. LSI hub processor 410 may also be used to more efficiently physically partition data between databases by redirecting the placement of similar clusters in the same database in order to create concept domains having a greater number of data objects thereby making subsequent retrieval or text mining operations more efficient. LSI hub processor 410 may also be used to index new documents in a relevant partition, either physically or virtually, in order to place documents having similar semantic attributes in the same conceptual domain. In presenting a result to a user, the LSI hub processor can be requested by the user to present either a ranked list of results grouped by concept domain or a ranked list of results across all queried domains, depending on user preference.

An embodiment of the present invention was used to partition and query the NSF Awards database that contains abstracts of proposals funded by the NSF since 1989. Information on awards made prior to 1989 is only available if the award has since been amended. A total of 22,877 abstracts selected from 378 different NSF programs were used with a total count of 114,569 unique terms.

The distributed LSI method of the present invention provides a set of concept classes, the number of these dependent on the level of resolution (or similarity), along with a set of keywords to label each class. The actual selection of the final set of concept classes is an iterative process whereby the user tunes the level of resolution to suit his or her purpose. To assist the user, the algorithm provides some metrics for the current cluster. For example, concepts classes (represented by their keywords) for two such levels of resolution are listed below.

Level of Resolution: Low
Class 1={ccr, automatically, implementations, techniques, project, algorithms, automatic, systems, abstraction. high-level}
Class 2={university, award, support, students, at, universities, institutional, provides, attend, faculty}
Class 3={study, constrain, meridional, thermohaline, ocean, climate, hemispheres, greenland, observations, eastward}
Class 4={species, which, animals, how, genetic, animal, evolutionary, important, understanding, known}

Level of Resolution: High
Class 1{=runtime, high-level, run-time, execution, concurrency, application-specific, software, object-based, object-oriented, dsm}
Class 2={problems, approximation, algorithmic, algorithms, approximating, algorithm, computationally, solving, developed, algebraic}
Class 3={support, award, university, institutional, attend, universities, students, forum, faculty, committee}
Class 4={materials, ceramic, fabricate, microstructures, fabrication, ceramics, fabricated, manufacture, composite, composites}
Class 5={meridional, wind, magnetosphere, magnetospheric, circulation, hemispheres, imf, magnetohydrodynamic, field-aligned, observations}
Class 6={plate, tectonic, faulting, strike-slip, tectonics, uplift, compressional, extensional, geodetic, geodynamic}
Class 7={compositions, isotopic, composition, hydrous, carbonaceous, fractionation, carbon, minerals, dissolution, silicates}
Class 8={cells, protein, proteins, cell, which, regulation, gene, regulated, biochemical, expression}
Class 9={species, evolutionary, deb, genus, populations, endangered, ecological, phylogeny, diversification, diversity}

The preliminary clusters and concept labels obtained using the present invention show that the algorithm seems adept at finding new (or hidden) concepts when the level of resolution is increased. Further, the concept labels returned by the algorithm are accurate and get refined as the level of resolution is increased.

In this case, a simple implementation of the query algorithm for distributed LSI was used. Given a query (set of terms), the algorithm produces a set of query terms for each LSI space in the distributed environment, which is further, refined by a cut-off score. The algorithm uses a set of similarity metrics, as discussed earlier. Results from individual LSI queries are collected, thresholded and presented to the user, categorized by concept. A subset of the NSF Awards database containing 250 documents was selected from each of the following NSF directorate codes:
1. ENG Engineering
2. GEO Geosciences
3. SBE Social, Behavioral and Economic Sciences
4. HER Education and Human Resources
5. MPS Mathematical and Physical Sciences
6. CSE Computer and Information Science and Engineering
7. BIO Biological Sciences Through these selections, the entire collection of 1750 documents was ensured to be semantically heterogeneous. Next, eight different LSI spaces were computed—one for all documents belonging to each directorate code, and a final one for the entire collection. The distributed query algorithm was run on the seven LSI spaces and the usual query on the comprehensive space. For comparison purposes, the actual document returned provided the final benchmark because the distributed LSI query mechanism was expected to perform better.

The main query consisted of the terms {brain, simulation}, and this was fed to the query algorithm. Further, a cut-off of 0.5 (similarity) was set system-wide. The extended query sets (using the cut-off) generated by the algorithm are listed below.

BIO: {brain, simulations (2), extended, assessment}
CSE: {neural, simulation}
EHR, ENG, GEO, MPS: {mechanisms, simulation}
SBE: {brain, simulation}

The final query results were as follows. The query on the larger LSI space returned no results which had similarity scores greater than 0.5. However, the top ten contained a couple of documents related to brain simulation but with low scores. These two documents were reported in the results from BIO and SBE with similarity scores greater than 0.5. Another document (not found earlier) was reported from the CSE space with a score above 0.5. This document turned out to be an abstract on neural network algorithms that indeed was related to the query. The other spaces returned no documents with similarity scores above 0.5.

The above description has been presented only to illustrate and describe the invention. It is not intended to be exhaustive or to limit the invention to any precise form disclosed. Many modifications and variations are possible in light of the above teaching. The applications described were chosen and described in order to best explain the principles of the invention and its practical application to enable others skilled in the art to best utilize the invention on various applications and with various modifications as are suited to the particular use contemplated.

We claim:

1. A computer-implemented method for processing a collection of data objects for use in information retrieval and data mining operations comprising the steps of:
generating a frequency count for each term in each data object in the collection;
partitioning the collection of data objects into a plurality of sub-collections using the term-by data object information, wherein each sub-collection is based on the conceptual dependence of the data objects within;
generating a term-by-data object matrix for each sub-collection;

decomposing the term-by data object matrix of each sub-collection into a reduced singular value representation;

determining the centroid vectors of each sub-collection;

finding a predetermined number of terms in each sub-collection closest to centroid vector; and, developing a similarity graph network to establish similarity between sub-collections.

2. The method of claim 1 further comprising the step of preprocessing the documents to remove a pre-selected set of stop words prior to generating the term frequency count for each data object.

3. The method of claim 2 wherein the step of preprocessing further comprises the reduction of various terms to a canonical form.

4. The method of claim 1 wherein the step of partitioning the collection is performed using a bisecting k-means clustering algorithm.

5. The method of claim 1 wherein the step of partitioning the collection is performed using a k-means clustering algorithm.

6. The method of claim 1 wherein the step of partitioning the collection is performed using hierarchical clustering.

7. The method of claim 1 wherein the predetermined number of terms is 10.

8. The method of claim 1 wherein the step of determining the centroid vectors of each sub-collection uses a clustering algorithm on the reduced singular value representation of the term-by-data object matrix for said sub-collection.

9. The method of claim 1 wherein the step of determining the centroid vectors of each sub-collection is based on the result of the partitioning step.

10. The method of claim 1 wherein the reduced singular value representation of the term-by-data object for each sub-collection has approximately 200 orthogonal dimensions.

11. The method of claim 1 wherein the step of establishing similarity between sub-collections is based on the frequency of occurrence of common terms between sub-collections.

12. The method of claim 1 wherein the step of developing the similarity graph network is based on the semantic relationships between the common terms in each of the sub-collections.

13. The method of claim 1 wherein the step of developing the similarity graph network is based on the product of the frequency of occurrence of common terms between sub-collections and the semantic relationships between the common terms in each of the sub-collections.

14. The method of claim 11 wherein the step of developing the similarity graph network further comprises the steps of:

determining if a first sub-collection and a second sub-collection that have no common terms both have terms in common with one or more linking sub-collections; and, choosing the linking sub-collection having the strongest link.

15. The method of claim 12 wherein the step of developing the similarity graph network further comprises the steps of:

determining the correlation between a first sub-collection and a second sub-collection;

permuting said first sub-collection against said second sub-collection;

computing the Mantel test statistic for each permutation;

counting the number of times where the Mantel test statistic is greater than or equal to the correlation between said first sub-collection and said second sub-collection;

determining the p-value from said count;

calculating the measure for a proximity of order zero;

calculating the measure for the first order proximity; and, determining the semantic relationship based similarity measure s2 wherein $$s2=(s_{ij}{}^p+p)^{-1}.$$

16. A computer-implemented method of information retrieval in response to a user query from a user comprising the steps of:

partitioning a collection of data-objects into a plurality of sub-collections based on conceptual dependence of data-objects wherein the relationship between such sub-collections is expressed by a similarity graph network;

generating a query vector based on the user query;

identifying all sub-collections likely to be responsive to the user query using the similarity graph network; and, identifying data objects similar to query vector in each identified sub-collection; wherein the step of partitioning the collection of data objects further comprises the steps of:

generating a frequency count for each term in each data object in the collection;

partitioning the collection of data objects into a plurality of sub-collections using the term by data object information;

generating a term-by-data object matrix for each sub-collection;

decomposing the term-by-data object matrix into a reduced singular value representation;

determining the centroid vectors of each sub-collection;

finding a predetermined number of terms in each sub-collection closest to centroid vector; and developing a similarity graph network to establish similarity between sub-collections.

17. The method of claim 16 wherein the step of determining the centroid vectors uses a clustering algorithm on the reduced singular value representation of the term-by-data object matrix for said sub-collection.

18. The method of claim 16 wherein the method of claim 1 wherein the step of determining the centroid vectors of each sub-collection is based on the result of the partitioning step.

19. The method of claim 16 wherein the step of developing the similarity graph network further comprises the steps of:

determining if a first sub-collection and a second sub-collection that have no common terms both have terms in common with one or more linking sub-collections; and, choosing the linking sub-collection having the strongest link.

20. The method of claim 16 wherein the step of developing the similarity graph network further comprises the steps of:

determining the correlation between a first sub-collection and a second sub-collection;

permuting said first sub-collection against said second sub-collection;

computing the Mantel test statistic for each permutation;

counting the number of times where the Mantel test statistic is greater than or equal to the correlation between said first sub-collection and said second sub-collection;
determining the p-value from said count;
calculating the measure for a proximity of order zero;
calculating the measure for the first order proximity; and,
determining the semantic relationship based similarity measure s2 wherein $$s2=(s_i^p+p)^{-1}.$$

21. The method of claim 16 further comprising the step of preprocessing the documents to remove a pre-selected set of stop words prior to generating the term frequency count for each data object.

22. The method of claim 16 wherein the step of partitioning the collection is preformed using a bisecting k-means clustering algorithm.

23. The method of claim 16 further comprising the steps of:
ranking the identified sub-collections based on the likelihood of each to contain data objects responsive to the user query;
selecting which of the ranked sub-collections to query;
presenting the ranked sub-collections to the user; and,
inputting user selection of the ranked sub-collections to be queried.

24. The method of claim 16 wherein the step of generating a query vector based on the user query further comprises expanding the user query by computing the weighted sum of its projected term vectors in one or more concept domains that are similar to another concept domain that actually contains the query terms.

25. The method of claim 16 further comprising the step of presenting the identified data objects to the user ranked by concept domain.

26. A system for the retrieval of information from a collection of data objects in response to a user query comprising:

means for inputting a user query;
one or more data servers for storing said collection of data objects and for partitioning said collection of data objects into a plurality of sub-collections based on the conceptual dependence of data objects within; generating a term-by-data object matrix for each sub-collection;
an LSI processor hub in communication with each data server for: (i) developing a similarity graph network based on the similarity of the plurality of the partitioned sub-collections, (ii) generating a query vector based on the user query, (iii) identifying sub-collections likely to be responsive to the user query based on the similarity graph network; and for (ii) coordinating the identification of data objects similar to query vector in each selected sub-collection.

27. The system of claim 26 further comprising a means for presenting the identified data objects to the user.

28. A system for the processing of a collection of data objects for use in information retrieval and data mining operations comprising:
means for generating a frequency count for each term in each data object in the collection;
means for partitioning the collection of data objects into a plurality of sub-collections using the term-by-data object information;
means for generating a term-by-data object matrix for each sub-collection;
means for decomposing the term-by-data object matrix into a reduced singular value representation;
means for determining the centroid vectors of each sub-collection;
means for finding a predetermined number of terms in each sub-collection closest to centroid vector; and,
means for developing a similarity graph network to establish similarity between sub-collections.

* * * * *